(12) United States Patent
Gul

(10) Patent No.: US 7,036,224 B2
(45) Date of Patent: May 2, 2006

(54) METHOD OF MAKING FLUID SENSOR PROBE

(75) Inventor: S. Asim Gul, Orono, MN (US)

(73) Assignee: Mamac Systems, Inc., Eden Prairie, MN (US)

( * ) Notice: Subject to any disclaimer, the term of this patent is extended or adjusted under 35 U.S.C. 154(b) by 134 days.

(21) Appl. No.: 10/436,451

(22) Filed: May 12, 2003

(65) Prior Publication Data

US 2004/0227636 A1    Nov. 18, 2004

(51) Int. Cl.
   *H01R 43/00*      (2006.01)
   *G08B 21/00*      (2006.01)
(52) U.S. Cl. ................ 29/857; 29/858; 29/859; 29/868; 29/850; 29/894; 340/620
(58) Field of Classification Search ............. 29/857, 29/858, 859, 868, 850, 894, 496, 447, 448, 29/449, 450; 264/230, 272.11, 272.15; 73/866.5; 72/335, 327; 374/208, 209, 163; 340/620
See application file for complete search history.

(56) References Cited

U.S. PATENT DOCUMENTS

| | | | | |
|---|---|---|---|---|
| 3,878,830 | A | * | 4/1975 | Bicher .................. 600/360 |
| 4,137,768 | A | * | 2/1979 | Tushie et al. ............. 374/208 |
| 4,527,909 | A | * | 7/1985 | Dale et al. ............... 374/163 |
| 4,569,228 | A | * | 2/1986 | Bellgardt et al. ......... 73/866.5 |
| 4,830,013 | A | * | 5/1989 | Maxwell .................. 600/312 |
| 6,457,857 | B1 | | 10/2002 | Gul |

OTHER PUBLICATIONS

One page Dual Wall Flexible Clear Polyolefin With Thick Wall Adhesive (Sumitube® W3C) Mar. 12, 2003.
Two pages Dual Wall Flexible Polyolefin With Thick Wall Adhesive Military Specification (SubmitubeTM W3B2) Mar. 12, 2003.
3M Heat Shrink Tubing and Devices Manual (58 pages).

* cited by examiner

*Primary Examiner*—A. Dexter Tugbang
*Assistant Examiner*—Tai Van Nguyen
(74) *Attorney, Agent, or Firm*—Shewchuk IP Services, LLC; Jeffrey D. Shewchuk

(57) ABSTRACT

A fluid sensor probe such as a temperature probe uses heat shrink tubing to seal and provide strain relief at a proximal end of the probe. The heat shrink tubing uses a layer of hot melt adhesive along its inside surface to form a strong bond and hermetic seal. The heat shrink tubing is applied as an inner tubing around circuit wires extending into the probe and as an outer tubing around the inner tubing and around the proximal end of the probe housing. Together the inner tubing and the outer tubing can hermetically seal a substantial gap between the probe housing and the circuit wires. In a fast response probe, prior to closing the distal end of the probe housing with an end wall, openings are punched in a side wall of the probe housing against a mandrel. The openings permit fluid flow to contact the sensing element within the probe housing. Heat shrink tubing can be used to seal the circuit wires and prevent leakage.

20 Claims, 9 Drawing Sheets

METHOD OF MAKING FLUID SENSOR PROBE

CROSS-REFERENCE TO RELATED APPLICATION(S)

None.

BACKGROUND OF THE INVENTION

The present invention generally relates to a probe apparatus for electronically sensing a parameter of a fluid. In a specific embodiment, the present invention relates to a probe which can sense temperature with a fast response time, while having a construction which is simple and yet robust. Such temperature probes have many uses, such as for sensing air temperature in a controlled heating, ventilation and air conditioning ("HVAC") system.

Electronically based temperature sensors are well known in the art. In a typical construction, a temperature sensor includes a sensing element wired into an electrical circuit. The sensing element may be a thin strand of metal (such as a platinum resistive temperature detector or "RTD"), a thermocouple, or, commonly, a thermistor which changes its electrical resistance based on its temperature. In any event, the electrical response of the sensing element changes as a function of its temperature, such that the electrical circuit may be monitored to determine the temperature of the sensing element.

Because the sensing elements are typically somewhat fragile and delicate, the sensing elements are commonly housed in a generally rigid probe housing. The probe housing also serves to properly position the sensing element relative to the fluid flow. The rigid probe housing may be, for instance, a metallic tube or sheath.

In manufacturing assembly of the probe, the probe housing is closed at its distal end, and the sensing element and its electrical circuit is threaded into the open proximal end of the probe housing and through its length. The sensing element is thus positioned within the probe housing near the closed distal end, with wires (i.e., metal conductors within dielectric sheaths) extending the length of the probe and out of the open proximal end. The electrical resistance between the wires is indicative of sensed temperature. Once the probe is installed in the field, the wires then provide leads for the temperature probe to be electrically connected into a circuit such as a control circuit. During and after installation, the probe housing protects the sensing element from damaging contact.

After properly positioning the sensing element and wires within the probe housing during manufacturing assembly, the sensing element and wires are secured at their desired position. A common method of securing the wires/sensing element within the probe is through a curing epoxy. The thermistor may be encapsulated such as in epoxy within the sheath. The epoxy encapsulation ensures a good thermal conductivity connection between the sheath and the thermistor. The epoxy encapsulation also helps prevent damage to the thermistor due to handling of the probe. For instance, the epoxy encapsulation may extend over the final two inches or so on the distal end of the temperature probe.

The proximal end of the sheath may be also sealed such with an ultraviolet cured epoxy seal. For instance, epoxy may be flooded into the proximal end of the probe so the epoxy fills the gap between the wires and the inside diameter of the sheath along at least some length of the probe. The epoxy can then be cured (such as with exposure to UV radiation), thereby sealing the wires in place within the probe. The epoxy thus prevents the wires from rattling around within the probe during installation and use of the probe. With a good epoxy seal, the epoxy will also provide strain relief so pulling on the exposed ends of the wires will not remove the wires from the probe or otherwise damage the connections between the wires and the sensing element.

In some sensing systems, fluid flow lengthwise within the probe housing may not be problematic. In many sensing systems, however, fluid flow lengthwise within the probe is very undesirable. If the fluid pressure being measured is higher or lower than ambient, fluid flow lengthwise within the probe could represent a leak in the system. Closing the distal end of the probe housing provides a significant barrier to prevent fluid flow within the housing along its length. The cured epoxy commonly provides another level of protection to minimize or prevent fluid flow within the housing.

Because they are relatively robust and perform satisfactorily for many applications, the closed end metal housing/epoxy secured types of probes have gained widespread acceptance. However, further improvements can be made in constructing probes which make the probes perform better, such as having a faster response time. Savings can be made to reduce the cost of materials and manufacturing costs of the probes, making the probes less expensive. Improvements can be made for lower failure rates, and to make the probes less likely to be damaged in the field.

BRIEF SUMMARY OF THE INVENTION

The present invention involves forming a fluid sensor probe such as a temperature probe using heat shrink tubing. In one aspect, the heat shrink tubing with hot melt adhesive can be used to seal and provide strain relief at a proximal end of the probe. The heat shrink tubing can be applied as an inner tubing around circuit wires extending into the probe and an outer tubing around the inner tubing and around the proximal end of the probe housing. A fast response probe can be formed by punching openings in a distal side wall of the probe against a mandrel and prior to closing the distal end wall. Such openings permit fluid flow to contact the sensing element within the probe housing. Heat shrink tubing with hot melt adhesive can be used to seal the circuit wires and prevent leakage.

Figure 1:
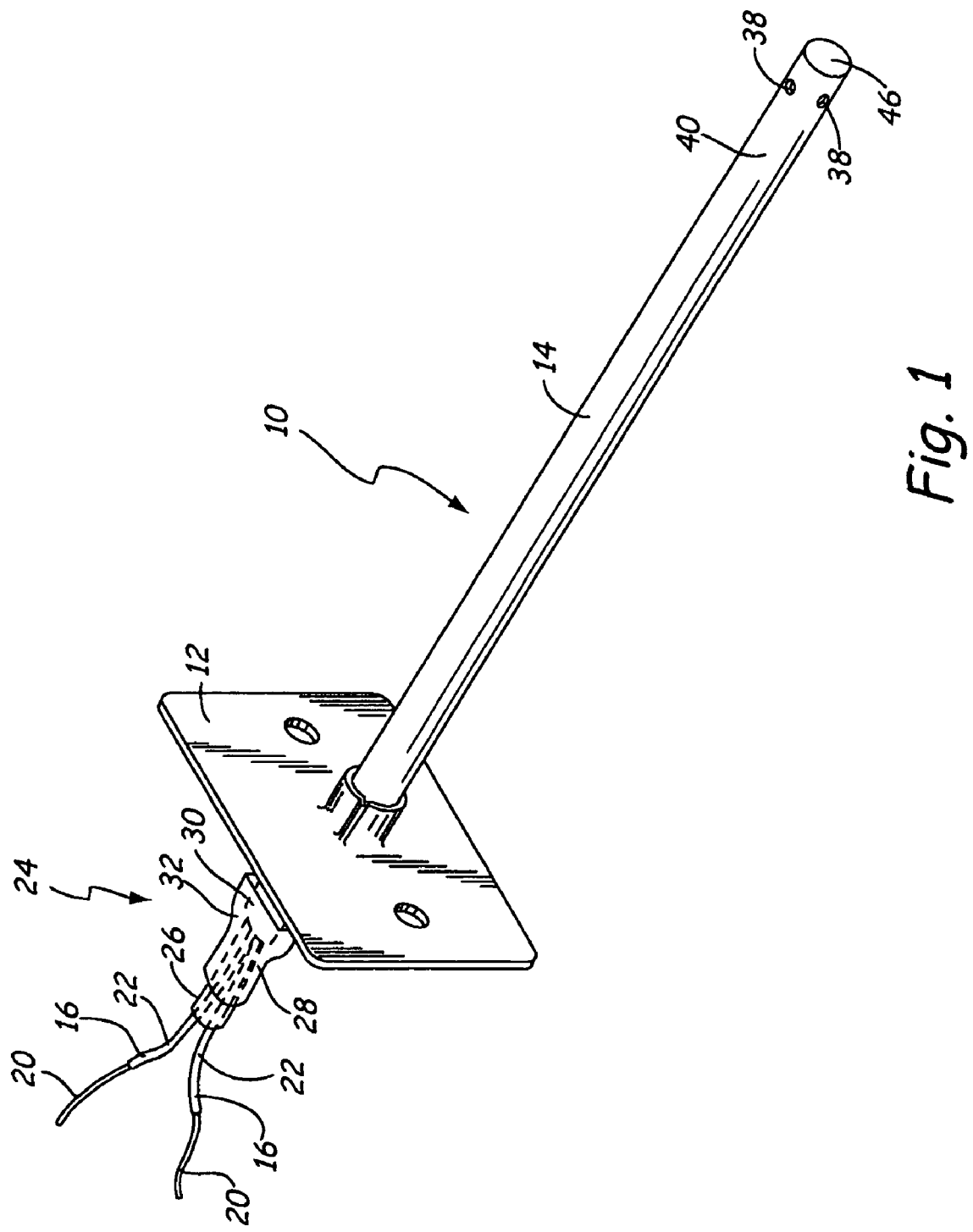
FIG. 1 is a perspective view of a preferred embodiment of a probe in accordance with the present invention.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The present invention generally includes a probe 10 for sensing a fluid. The probe 10 can measure any type of fluid (air, water, oil, etc.), and can measure any of numerous parameters (temperature, pressure, humidity, flow rate etc.). However, the invention is particularly described with regard to a preferred embodiment which is a temperature sensing probe primarily intended for use in air flows. For instance, the probe 10 can be a sheathed and flanged temperature probe as generally described in U.S. Pat. No. 6,457,857 to Gul, incorporated herein by reference. Such a probe 10 includes a flange member 12 and a tubular housing or sheath 14. The sheath 14 can have a length as known in the art, typically with a length which is at least an order of magnitude greater than the outer diameter. Lengths such as from about 3 to 12 inches long are typical for a ¼ inch (6.3 mm) outside diameter probe 10. The sheath 14 may be formed such as of 304 stainless steel having a 20 mil (0.5 mm) wall thickness. The flange member 12 supports the sheathed temperature probe 10 and allows the sheathed temperature probe 10 to withstand drag from the flow into which the temperature probe 10 projects. Of course, many other types of securing arrangements may alternatively be provided for the probe 10.

Lead wires 16 for the sensing element 18 (shown in FIGS. 5 and 7–9) extend from the proximal end 30 of the sheath 14. Lead wires of any construction can be used, typically a single or multi-strand conductor 20 (commonly copper) within a flexible dielectric sheath 22. For instance, the preferred embodiment uses about 24 gauge wires, having an insulated outer diameter of about 0.050 inches (1.3 mm). These lead wires 16 are relatively flexible compared to the sheath 14, and the term "rigid" is used herein to designate that the sheath 14 is stronger and stiffer than the lead wires 16, and therefore protective of the lead wires 16. In many applications, the rigid sheath 14 maybe bendable tubing. The lead wires 16 are used when the probe 10 is installed (such as within an air duct (not shown) in a building) to electrically connect the probe 10 into a control system (not shown).

Figure 3:
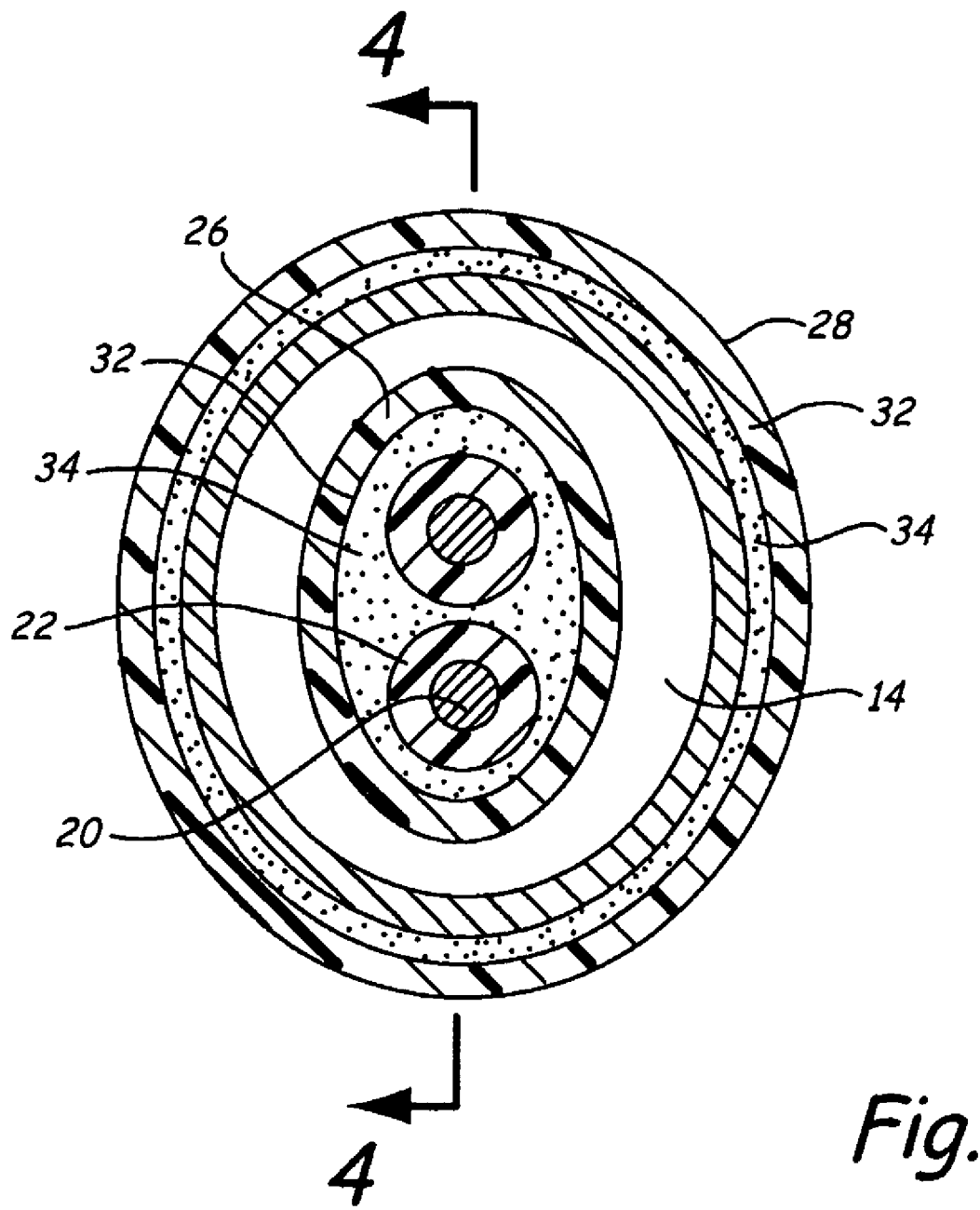
FIG. 3 an enlarged cross-sectional view of the probe of FIGS. 1 and 2 taken along line 3—3 in FIG. 2.
Figure 4:
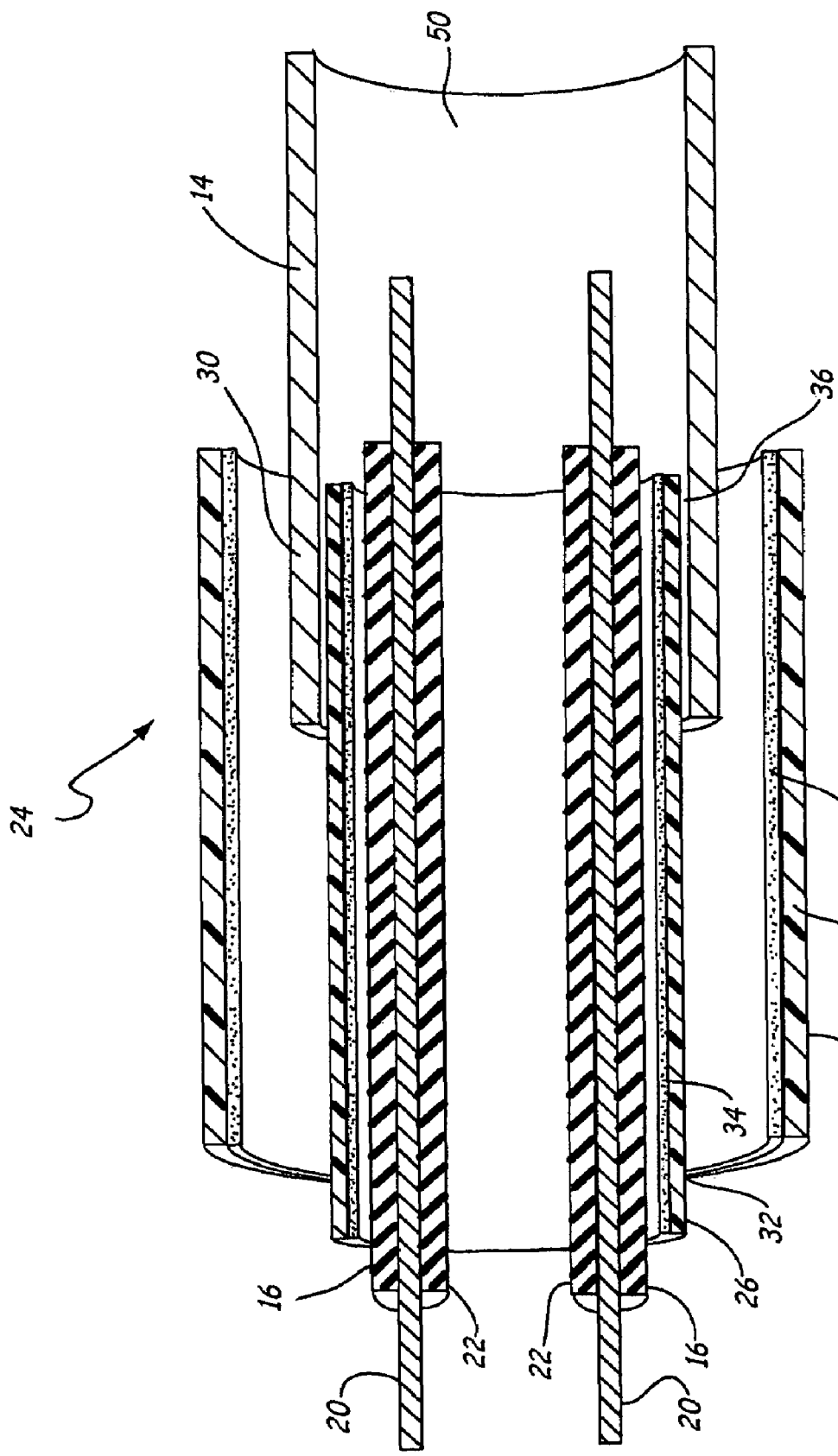
FIG. 4 is an enlarged, exploded, broken-out, cross-sectional view of the proximal end of the probe of FIGS. 1–3, from the direction defined by line 4—4 in FIG. 3.

In accordance with the preferred embodiment of the present invention, the lead wires 16 have a novel and non-obvious strain relief/sealing 24 to the rigid sheath 14. For instance, the lead wires 16 are shown with a first, interior shrinkwrap 26 and a second, exterior shrinkwrap 28. If desired, the interior heat shrink tubing 26 may be shrunk about at least one but less than all of the lead wires 16 extending out of the proximal end 30 of the rigid sheath 14. However, the interior shrinkwrap 26 preferably houses both wires 16. While the interior shrinkwrap 26 preferably maintains both wires 16 close to one another to assist in threading the wires 16 into the sheath 14, a primary benefit of the interior shrinkwrap 26 is protective. As best shown in FIGS. 3 and 4, the interior shrinkwrap 26 follows the lead wires 16 into the proximal end 30 of the rigid sheath 14. For instance, the interior shrinkwrap 26 may extend approximately one inch over the wires 16 and proximal to the sheath 14 and approximately one inch inside the proximal end 30 of the sheath 14. Prior to shrinking (see FIGS. 4 and 6), the interior shrinkwrap 26 is a tube having an outer diameter which is less than the inside diameter of the sheath 14, so the interior shrinkwrap 26 can be easily placed into the sheath 14 during assembly.

The exterior shrinkwrap 28 extends both over an exterior proximal portion 30 of the sheath 14 and over a portion of the lead wires 16 after they exit from the proximal end 30 of the sheath 14. For instance, the exterior shrinkwrap 28 may extend approximately half an inch over the interior shrinkwrap 26 proximal to the sheath 14 and approximately half an inch over the outside of the proximal end 30 of the sheath 14. Prior to shrinking (see FIGS. 4 and 6), the exterior shrinkwrap 28 is a tube having an inner diameter which is greater than the outer diameter of the sheath 14, so the exterior shrinkwrap 28 can be placed onto the proximal end 30 of the sheath 14 during assembly.

For both the interior shrinkwrap 26 and the exterior shrinkwrap 28, the preferred shrinkwrap material is cross-linked modified polyolefin tubing 32 having an adhesive coated interior 34. The tubing 32 is formed with a thick inner wall of a hot melt adhesive 34. For instance, the inner wall of the tubing 32 may be coated with polyamide adhesive 34 which melts and flows when heated, encapsulating and sealing the structure within the tubing 32. Such tubing is available as SUMITUBE W3C and SUMITUBE W3B2 from Sumitomo Electric Interconnect Products, Inc., and from 3M Company. Hot melt adhesive coated shrinkwrap tubing comes in standard sizes such as with unshrunk inside diameters of ⅛, 3/16, ¼, ⅜, ½, ¾ and 1 inch. Shrink ratios range from about 2:1 to about 4:1, having a wall thickness after shrinking of about 0.04 to 0.08 inches (1 to 2 mm). The shrink temperature of such tubing ranges from about 100 to 135° C. As examples, the exterior shrinkwrap 28 for a ¼ OD probe sheath 14 may have a ¼ inch nominal ID prior to shrinking, while the interior shrinkwrap 26 may have a ⅛ inch nominal ID for use within the 0.21 inch ID of the probe sheath 14 and about the two 0.05 inch ODs of the wire insulation 22.

One important aspect of the interior shrinkwrap 26 and the exterior shrinkwrap 28 is that together they completely bridge the gap 36 between the outer diameter of the lead wires 16 and the outer diameter of the sheath 14. This gap 36 in size can be substantial, and can be equal to or greater than the shrink ratio of the heat shrink tubing. For instance, while shrink ratios of the available heat shrink tubing can approach 4:1, the interior shrinkwrap/exterior shrinkwrap combination 24 can bridge the gap 36 for a circuit wire 16 having a circuit wire outer diameter which is no greater than 25% of the sheath outer diameter. In the preferred embodiment, the gap 36 exists between the 0.05 inch outer diameter of the lead wires 16 and the 0.25 inch outer diameter of the sheath 14. This 5:1 ratio between the 0.25 inch outer diameter of the sheath 14 and the 0.05 inch outer diameter of the lead wires 16 exceeds the shrink ratio of a single shrinkwrap tubing, and thus might easily be perceived as being too great of a difference to bridge using shrinkwrap tubing, and certainly too great of a difference to bridge using shrinkwrap tubing to result in a secure connection. However, the dual interior shrinkwrap/exterior shrinkwrap connection 24 which results from this invention is extremely strong, rugged and robust. The adhesive material 34 flows to tightly secure the exterior shrinkwrap 28 to the sheath 14. The adhesive material 34 also flows to tightly secure the interior shrinkwrap 26 to the lead wires 16, to fill in gaps between the two lead wires 16, and to tightly secure the exterior shrinkwrap 28 to the interior shrinkwrap 26. Proper application of the interior shrinkwrap 26 and the exterior shrinkwrap 28 provides such a tight securement that a tensile pull force on the order of a hundred pounds or more will not dislodge the lead wires 16 from the sheath 14. Similarly, the protective factor and limited degree of flexibility provided by the interior and exterior shrinkwrap 26, 28 makes the lead wires 16 substantially unbreakable and untearable at the location that the lead wires 16 feed into the sheath 14.

A second important aspect of the interior shrinkwrap 26 and the exterior shrinkwrap 28 is that together they hermetically seal between the two radially different and radially separated components of the lead wires 16 and the outer diameter of the sheath 14. In contrast to epoxy sealant, shrinkwrap is not traditionally used to form a radially oriented hermetic seal between two different components. In the preferred embodiment, the interior shrinkwrap 26 and exterior shrinkwrap 28 completely replace the epoxy sealant on the proximal end of the prior art probes. By avoiding the use of epoxy sealant, the time and mess associated with applying the epoxy and curing the epoxy are entirely eliminated. In assembly, the interior shrinkwrap 26 and exterior shrinkwrap 28 can both be applied and shrunk to make the secure connection in a much faster time period than the application and curing of the epoxy sealant.

Figure 2:
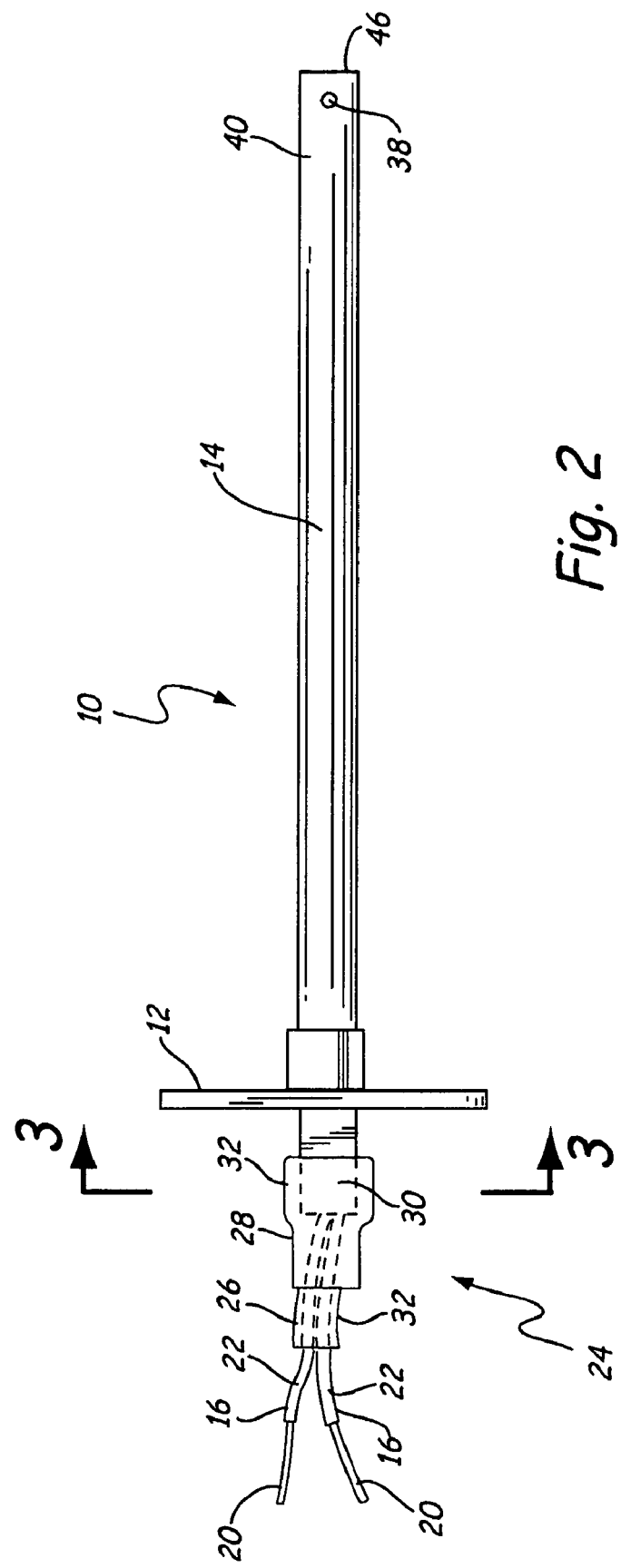
FIG. 2 a plan view of the probe of FIG. 1.

The preferred shrinkwrap tubing is transparent, and is depicted as such in FIGS. 1 and 2. However, colored shrinkwrap tubing may be equivalently used.

Figure 5:
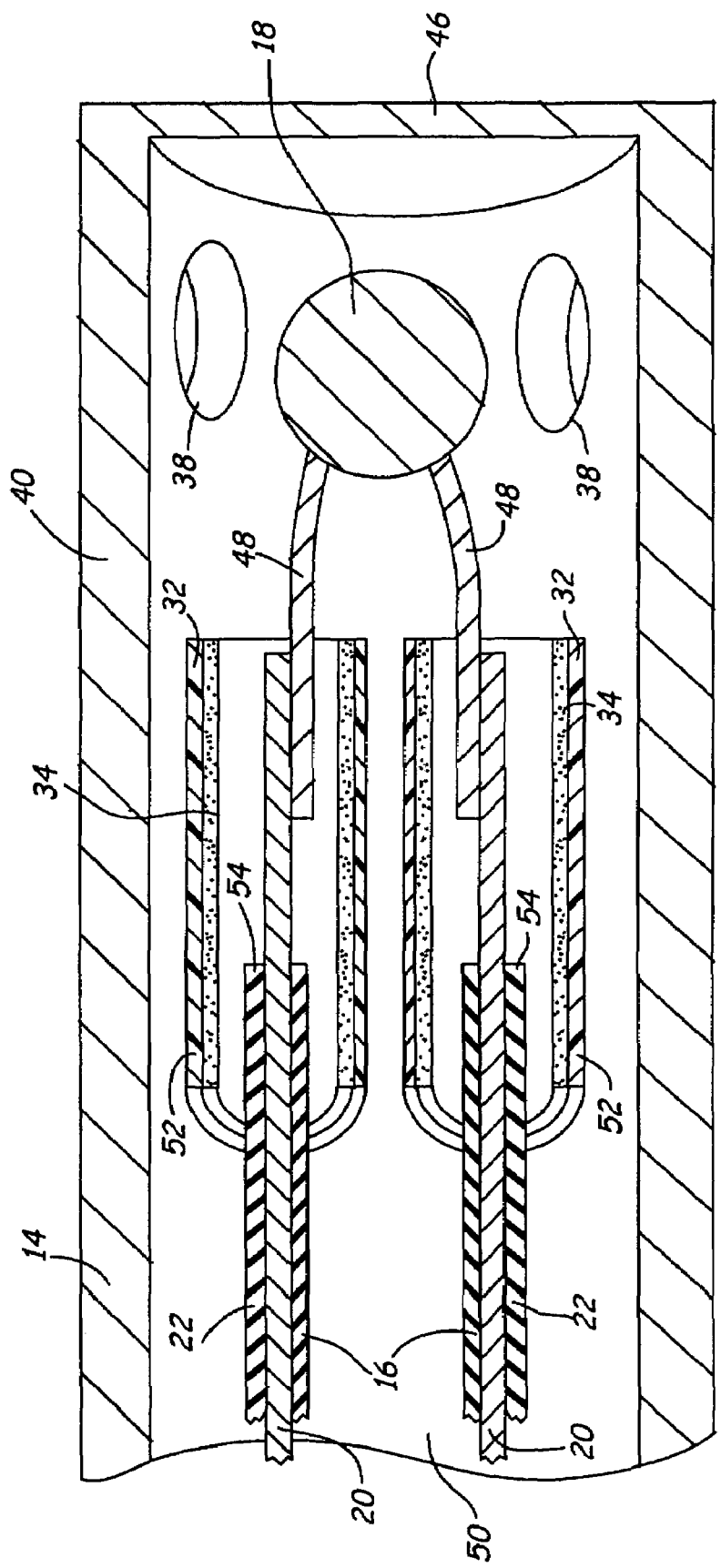
FIG. 5 is an enlarged, exploded, broken-out, cross-sectional view of the distal end of the probe of FIGS. 1–3.

As best shown in FIGS. 1, 2 and 5, the preferred probe 10 includes openings 38 in the distal end 40 of the sheath 14. These openings 38 allow the sensed flow to travel within the distal end 40 of the sheath 14 in direct contact with the sensor or thermistor 18. Because the fluid can flow in direct contact with the thermistor 18, the preferred probe 10 has an extremely fast response time to changes in temperature of the fluid. That is, because the sensed fluid flow travels through the openings 38 and into direct contact with the thermistor 18, the thermal mass and thermal conductivity of the sheath 14 contribute essentially no delay to the thermal response time of the probe 10. Further, the preferred embodiment uses no epoxy encapsulation whatsoever at the thermistor 18, again resulting in a faster thermal response because no thermal mass or thermal conductivity of the epoxy encapsulation delays response time.

Figure 6:
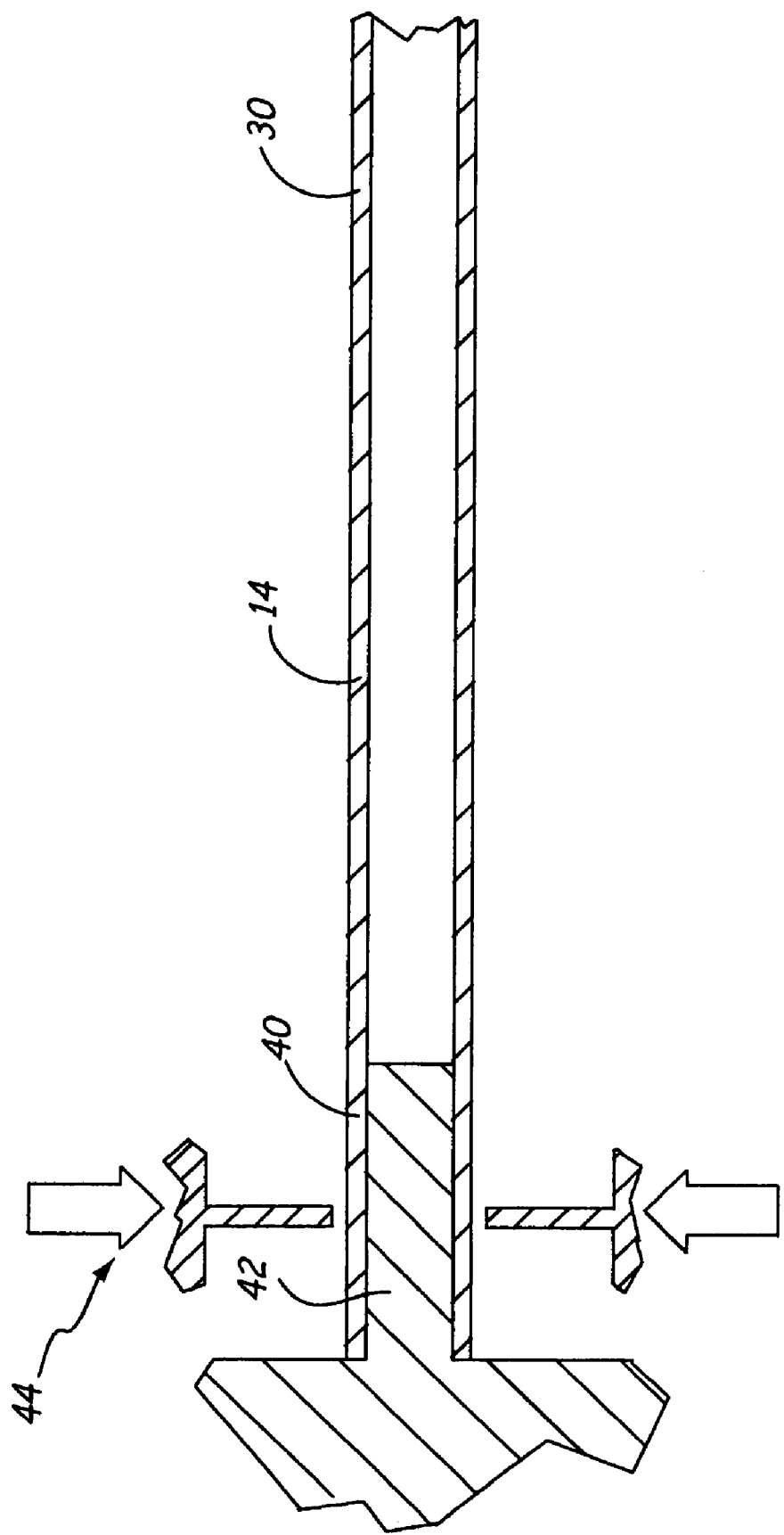
FIG. 6 is a cross-sectional view of the sheath of the probe of FIGS. 1–3 during the preferred method of manufacture.

The method of forming the preferred sheath 14 with openings 38 is further detailed with reference to FIG. 6. In particular, the openings 38 are preferably punched into the distal end 40 of the probe sheath 14. However, the wall thickness and ductility of the preferred sheath 14 generally prevent the sheath 14 from withstanding the force of a punching operation without buckling or bending. Accordingly, the preferred punching operation involves using a mandrel 42 to support the wall of the sheath 14 from inside, and punching from the outside in against the mandrel 42. To do this in an efficient, precise manner, the distal end 40 of the sheath 14 must be open at the time of the punching operation, with the mandrel 42 placed into the sheath tube 14 from the distal end 40. The preferred punch 44 punches two openings 38 in the distal end 40 of the sheath 14 at a time, from opposing 180° directions. The preferred probe 10 has four punched circular openings 38 of about 0.08 inch (2 mm) inner diameter, spaced at 90° intervals about the longitudinal axis. To obtain these four openings 38, the punching operation is performed twice on the preferred punch 44 depicted in FIG. 6, with a 90° rotation of the sheath tube 14 about its longitudinal axis between punches.

After the openings 38 are punched in the open distal end 40 of the sheath tube 14, the distal end 40 of the sheath tube 14 is closed by a cold rolling operation to form a hermetically sealed end wall 46. Should the thermistor 18 make contact with the distal end wall 46, the flatness of the end wall 46 provides a good contact contrast to the rounded end of the thermistor 18 to minimize thermal response time. The flatness of the end wall 46 also maximizes the strength of the sheath 14 in protecting the thermistor 18.

The preferred sensing element 18 is a thermistor, which changes electrical resistance in a known manner responsive to changes in temperature. Such thermistors are commonly commercially available in various ohmic ratings, such as from BetaTHERM Corporation of Shrewsbury, Mass. For example, thermistors which have a nominal resistance at 25° C. of 1.8 k$\Omega$, 2.252 k$\Omega$, 3 k$\Omega$, 5 k$\Omega$, 10 k$\Omega$, 20 k$\Omega$, and 100 k$\Omega$ are commonly used in the heating, ventilation and air conditioning ("HVAC") industry. Such thermistors may be formed by intimately blending high purity inorganic powders (typically transition metal oxides), which are then formed into large wafers, sintered and prepared for chip thermistor production. Alternatively, the sensing element 18 maybe a Platinum, Nickel or Balco RTD, such as rated at 0.1 k$\Omega$ or 1 k$\Omega$. While the preferred embodiment is a temperature sensor, the present invention is equally applicable to a wide variety of sensing elements having an electrical response which changes as a function of a parameter of the fluid being sensed, such as pressure, flow rate or humidity sensors. Each sensing element 18 has two electrical leads 48 for connection into a circuit.

Between the thermistor 18 and the preferred interior shrinkwrap 26, there is an unfilled or substantially hollow section 50 in the middle of the sheath 14. With the preferred construction, this hollow section may have a length from ½ inch to about 9½ inches. This central hollow section 50 provides some thermal insulation so the thermistor 18 is affected as little as possible due to thermal conduction with the temperature of the wall (not shown) to which the temperature probe 10 is attached.

The preferred embodiment thus includes three elements distinctly different from the prior art which could potentially lead to leakage of the fluid flow through the probe 10, namely: (a) openings 38 in the distal end 40 of the sheath 14; (b) a lack of epoxy encapsulation at the distal end 40 of the probe 10; and (c) a lack of epoxy sealant at the proximal end 30 of the probe 10. The combination interior shrinkwrap/exterior shrinkwrap 24 has proven to provide a hermetic seal on the proximal end 30 of the probe 10 that prevents fluid leakage between the lead wires 16 and the sheath 14 along the length of the probe 10. The hermetic seal provided by the combination interior shrinkwrap/exterior shrinkwrap 24 has also proven to be quite reproducible, increasing manufacturing yield.

By the very nature of temperature testing, temperature probes are commonly positioned across temperature gradients, such as within an air conditioning system wherein the air temperature being sensed within a duct is significantly cooler than the metal of the duct itself. When a thermal gradient regularly exists along the length of the probe, even a hermetically closed distal end of the probe may not completely prevent the problem of fluid flow within the housing. Just by virtue of convection currents, air may still flow from outside the duct, through proximal end of the probe to the sensing element, and then cycle or otherwise return back out of the proximal end of the probe. While such fluid flow would not cause any leak in the system, it can still be very problematic. As one example, humidity may condense at the cooler distal interior of the probe, tending the short the thermistor out of the electrical circuit. The interior shrinkwrap/exterior shrinkwrap seal 24 at the proximal end 30 of the sheath 14 has proven very good at minimizing such flow.

Even with the proximal end 30 of the probe 10 hermetically sealed off, however, it has been discovered that it is still possible to have longitudinal leakage or flow through the probe 10. Namely, it has been discovered that commercially available wires 16, with a single or stranded conductor 20 within an insulative sheath 22, do not hermetically seal between the conductor 20 and the insulative sheath 22. When pressure gradients setup longitudinally within the probe 10 (either due to temperature gradients or because pressure within the duct is different than pressure outside the duct), it has been discovered that air may flow within the wires 16, that is, between the insulative sheath 22 and the conductor 20. By creating openings 38 in the distal end 40 of the sheath 14, the present invention exacerbates this potential problem, such that fluid flow within the wires 16 can become a leak point in the fluid system. The preferred embodiment of the present invention accordingly addresses the possibility of fluid flow within the wires 16 as well.

Figure 7:
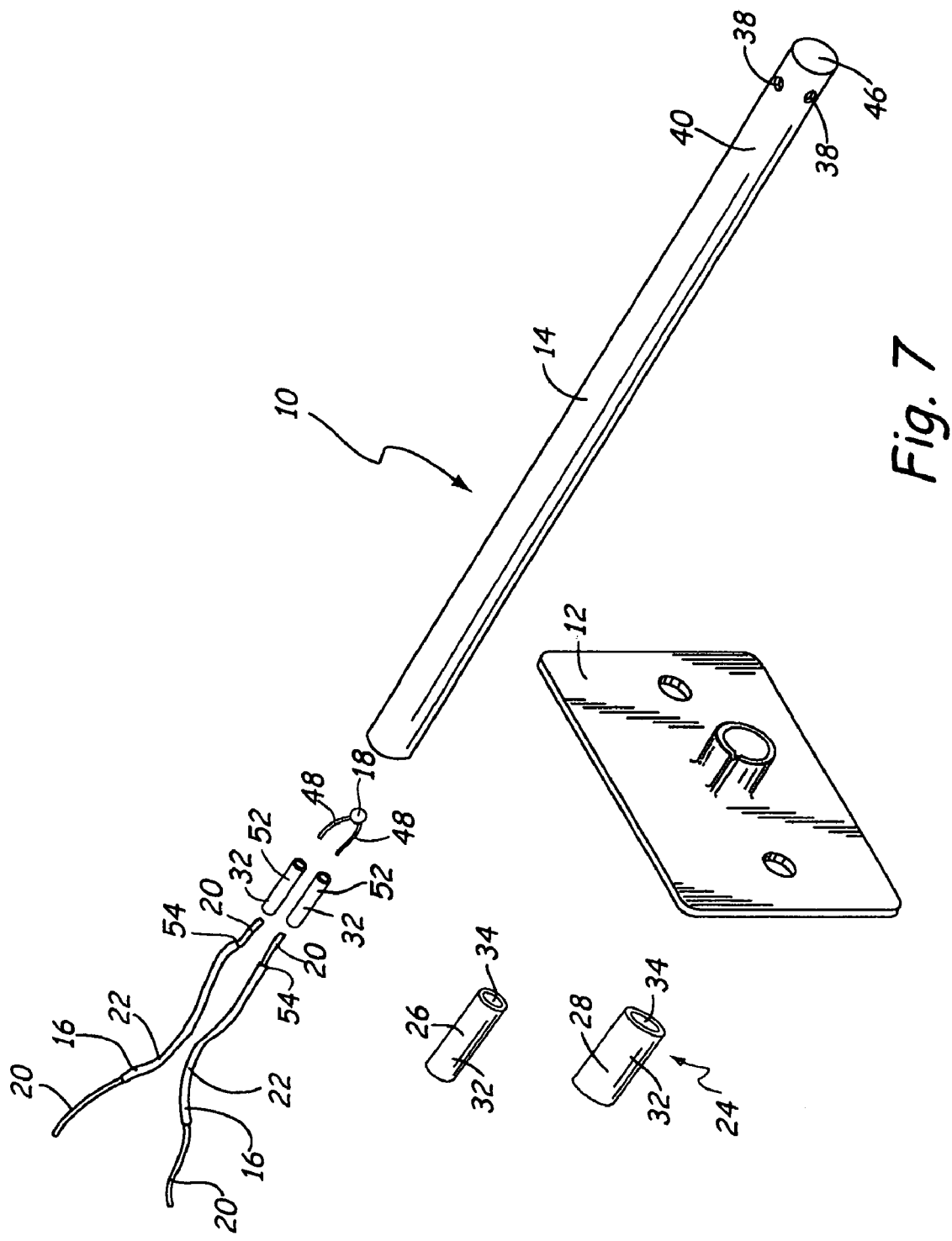
FIG. 7 is an exploded, perspective view of the probe of FIGS. 1–5.
Figure 8:
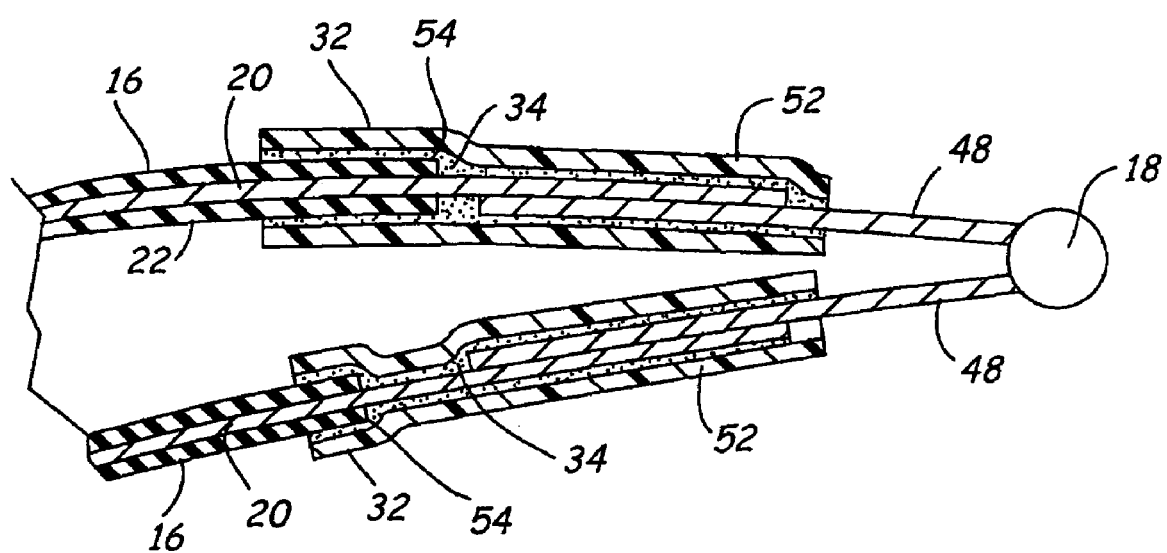
FIG. 8 is a cross-sectional view of the thermistor, wires and adhesive shrinkwrap during assembly and prior to insertion into the sheath of FIGS. 6 and 7.

As best shown in FIGS. 5, 7 and 8, seal shrinkwrap 52 is provided at the terminal distal ends 54 of the insulative sheaths 22 of the lead wires 16. The seal shrinkwrap 52 can be formed of the same material as the preferred interior and exterior shrinkwraps 26, 28 a cross-linked modified polyolefin tubing 32 having its interior coated with polyamide adhesive 34. The seal shrinkwrap 52, and particularly the adhesive layer 34 within the seal shrinkwrap 52, flows and coats the conductor 20 of the lead wire 16 to seal between the conductor 20 and the distal terminal end 54 of its insulation 22, thereby preventing any longitudinal fluid flow from occurring within the lead wires 16. To perform this sealing function, the seal shrinkwrap 52 extends longitudinally for about ¼ inch on either side of the distal terminal end 54 of the insulation 22.

As best shown in FIGS. 5 and 8, the seal shrinkwrap 52 can be lengthened to cover the connection between the conductors 20 of the lead wires 16 and the leads 48 of the thermistor 18, and thereby perform its more traditional function of improving, protecting and insulating the electrical connection between conductors 20. Whether the connections are made by splicing, using a solder bead, adhesive, taping or through other means, the shrinkwrap helps secure the connections. The shrinkwrap 52 also effectively seals the electrical connections of the thermistor 18 to the lead wires 16 against shorting, and minimizes condensation problems.

Figure 9:
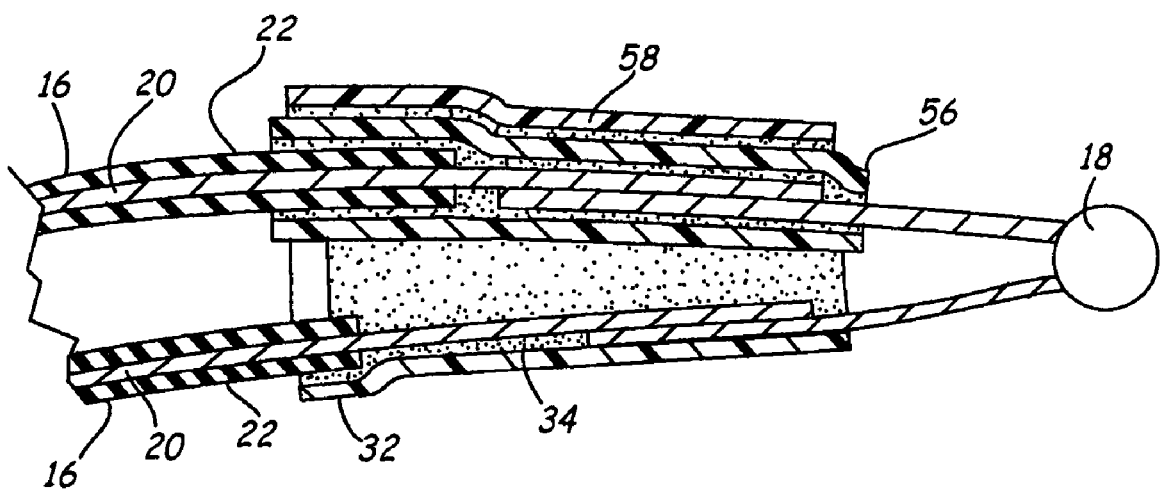
FIG. 9 is a cross-sectional view of an alternative construction of the thermistor, wires and adhesive shrinkwrap during assembly and prior to insertion into the sheath of FIGS. 6 and 7.

FIG. 9 depicts an alternative embodiment of the seal shrinkwrap 52 of the present invention. In the embodiment of FIG. 9, a first shrinkwrap tubing 56 is placed over the terminal distal end 54 of the insulation 22 of one of the lead wires 16. A second shrinkwrap tubing 58 of a larger diameter is then used to cover both the first shrinkwrap tubing 56 and the terminal distal end 54 of the insulation 22 over the other of the lead wires 16. Like the embodiment depicted in FIG. 8, both shrinkwrap tubings 56, 58 may be extended longitudinally to cover the electrical connection between conductors 20 and sensor element leads 48. One advantage the embodiment of FIG. 9 is that the second shrinkwrap 58 not only seals the second lead wire 16 against leakage, but also holds the two lead wires 16 together. Further, if desired the first shrinkwrap tubing 56 can be formed of a less expensive insulative material, such as electrical tape or traditional shrinkwrap without adhesive. The purpose of the first shrinkwrap 56 is then solely one of electrically insulating one set of connections from the other set of connections. The second, larger diameter shrinkwrap tubing 58 should then be made long enough to effective seal both the lead wires 16 against leakage.

In the preferred method of assembly, at least the seal shrinkwrap 52 is heat shrunk prior to placement of the thermistor/lead wires combination into the rigid sheath 14. Heat shrinking the seal shrinkwrap 52 in place onto the lead wires 16 avoids difficulties associated with the possibility of the seal shrinkwrap 52 changing longitudinal locations when the thermistor 18 is threaded the length of the sheath 14. Heat shrinking the seal shrinkwrap 52 in place prior to insertion into the rigid sheath 14 also allows easier inspection of the heat shrinking operation so a good seal can be visually ensured.

In the preferred method of assembly, both the interior shrinkwrap 26 and the exterior shrinkwrap 28 are heat shrunk simultaneously in a single operation. Simultaneous shrinking of both the interior shrinkwrap 26 and the exterior shrinkwrap 28 ensures that the interior shrinkwrap 26 is properly positioned in its desired longitudinal location both relative to the exterior shrinkwrap 28 and relative to the rigid sheath 14. Alternatively, the interior shrinkwrap 26 can be heat shrunk into place prior to placing the thermistor 18 into the sheath 14, with the exterior shrinkwrap 28 heat shrunk as a later operation.

Although the present invention has been described with reference to preferred embodiments, workers skilled in the art will recognize that changes may be made in form and detail without departing from the spirit and scope of the invention.

The invention claimed is:

1. A method of making a fluid sensor probe, comprising:
    inserting a sensing element into a rigid sheath, the sensing element having an electrical response which changes as a function of a parameter of the fluid to be sensed, the rigid sheath extending longitudinally between a proximal end and a distal end, such that the sensing element is disposed in the distal end of the rigid sheath, with circuit wires running longitudinally within the rigid sheath to the sensing element and extending out of the proximal end of the rigid sheath; and
    heat shrinking tubing around an exterior of the proximal end of the rigid sheath and around the circuit wires extending out of the proximal end of the rigid sheath.

2. The method of claim 1, further comprising:
    melting hot melt adhesive within the heat shrink tubing to hermetically seal the heat shrink tubing to the sheath and to the circuit wires.

3. The method of claim 2, wherein the heat shrinking and melting steps are performed by heating to at least 100° C.

4. A method of making a fluid sensor probe, comprising:
    inserting a sensing element into a rigid sheath, the sensing element having an electrical response which changes as a function of a parameter of the fluid to be sensed, the rigid sheath extending longitudinally between a proximal end and a distal end, such that the sensing element is disposed in the distal end of the rigid sheath, with circuit wires running longitudinally within the rigid sheath to the sensing element and extending out of the proximal end of the rigid sheath:
    heat shrinking tubing about the proximal end of the rigid sheath and about the circuit wires extending out of the proximal end of the rigid sheath; and
    punching at least one opening in the distal end of the rigid sheath.

5. The method of claim 4, wherein the punching act comprises:
   placing a circumferential side wall of the sheath about a mandrel inserted through the distal end of the sheath while the distal end is still open;
   punching at least one opening in the circumferential side wall against the mandrel;
   removing the mandrel through the open distal end; and
   closing the distal end of the sheath.

6. The method of claim 1, wherein the heat shrinking act comprises:
   heat shrinking a first heat shrink tubing about at least one of the circuit wires; and
   heat shrinking a second heat shrink tubing about the first heat shrink tubing.

7. The method of claim 6 wherein the first heat shrink tubing is of a smaller pre-shrunk diameter than the second heat shrink tubing.

8. A method of making a fluid sensor probe, comprising:
   inserting a sensing element into a rigid sheath, the sensing element having an electrical response which changes as a function of a parameter of the fluid to be sensed, the rigid sheath extending longitudinally between a proximal end and a distal end, such that the sensing element is disposed in the distal end of the rigid sheath, with circuit wires running longitudinally within the rigid sheath to the sensing element and extending out of the proximal end of the rigid sheath;
   heat shrinking tubing about the proximal end of the rigid sheath and about the circuit wires extending out of the proximal end of the rigid sheath;
   electrically connecting a first lead of the sensing element to an exposed metallic core extending out of a dielectric sheath of a first circuit wire;
   heat shrinking tubing about a distal end of the dielectric sheath of the first circuit wire and about the exposed metallic core to seal the first circuit wire against internal leakage.

9. The method of claim 8, further comprising:
   opening at least one opening in the distal end of the rigid sheath to permit fluid flow within the rigid sheath proximate the sensing element.

10. The method of claim 1, wherein the sensed parameter is fluid temperature.

11. A method of forming a hermetic seal with a rigid sheath of a fluid sensing probe, comprising:
   heat shrinking a first tubing; and
   heat shrinking a second tubing into hermetic contact with the first tubing; such that the first and second tubings jointly form at least a portion of a hermetic seal blocking fluid from flowing longitudinally within the rigid sheath, despite the rigid sheath having openings which permit fluid to flow into the rigid sheath and into contact with a sensing element disposed within the rigid sheath.

12. The method of claim 11, wherein the second tubing is shrunk about a proximal end of the rigid sheath.

13. The method of claim 11, wherein the first tubing is of a smaller pre-shrunk diameter than the second tubing.

14. The method of claim 11, wherein the first tubing is shrunk about at least one circuit wire leading to the sensing element.

15. The method of claim 14, wherein the first tubing is shrunk into contact with a metallic core of the circuit wire.

16. A method of forming a fast response fluid sensing probe, comprising:
   opening at least one opening into a distal end of a probe to permit fluid to flow into contact with a sensing element disposed therein;
   electrically connecting the sensing element with a lead wire having a dielectric sheath disposed about a conductor; and
   forming a hermetic seal between the conductor and the dielectric sheath of the lead wire.

17. A method of forming a tubular sheath for a fast response fluid sensor probe, comprising:
   forming a tubular sheath, the tubular sheath having a circumferential side wall running longitudinally between an open distal end and an open proximal end;
   placing the circumferential side wall of the tubular sheath about a mandrel inserted through the open distal end;
   punching at least one opening in the circumferential side wall against the mandrel;
   removing the mandrel through the open distal end; and
   closing the distal end of the tubular sheath.

18. The method of claim 17, wherein the tubular sheath is formed of metal.

19. The method of claim 18, wherein the distal end of the tubular sheath is closed to have a generally flat end wall extending transverse to a longitudinal axis of the tubular sheath.

20. The method of claim 17, further comprising:
   placing a sensing element within the tubular sheath adjacent to the punched opening, with lead wires for the sensing element running the length of the tubular sheath and exiting the open proximal end of the tubular sheath; and
   sealing the open proximal end of the tubular sheath about the lead wires.

* * * * *